(12) United States Patent
Chen et al.

(10) Patent No.: US 8,261,006 B2
(45) Date of Patent: Sep. 4, 2012

(54) EFFICIENT MEMORY HIERARCHY IN SOLID STATE DRIVE DESIGN

(75) Inventors: Richard Chen, Milpitas, CA (US); Ping Hou, Fremont, CA (US); Chih Hsueh, Cupertino, CA (US)

(73) Assignee: Spansion LLC, Sunnyvale, CA (US)

( * ) Notice: Subject to any disclaimer, the term of this patent is extended or adjusted under 35 U.S.C. 154(b) by 485 days.

(21) Appl. No.: 11/960,601

(22) Filed: Dec. 19, 2007

(65) Prior Publication Data

US 2009/0164700 A1 Jun. 25, 2009

(51) Int. Cl.
*G06F 12/00* (2006.01)
(52) U.S. Cl. .................. 711/103; 711/3; 711/E12.008
(58) Field of Classification Search .................. None
See application file for complete search history.

(56) References Cited

U.S. PATENT DOCUMENTS

| | | | |
|---|---|---|---|
| 5,696,929 A * | 12/1997 | Hasbun et al. | 711/103 |
| 6,795,890 B1 * | 9/2004 | Sugai et al. | 711/103 |
| 2002/0156962 A1 * | 10/2002 | Chopra et al. | 711/3 |

* cited by examiner

*Primary Examiner* — Kevin Ellis
*Assistant Examiner* — Arvind Talukdar
(74) *Attorney, Agent, or Firm* — Turocy & Watson, LLP

(57) ABSTRACT

Systems and methods for improving the performance and reliability of flash memory solid state drive devices are described herein. A flash memory array component stores data. A memory hierarchy component transfers data between the host and the flash memory array component. The memory hierarchy component includes a level one ("L1") cache coupled to a merge buffer, the flash memory array component, and the host. The merge buffer is coupled to the flash memory array component. The L1 cache and merge buffer include volatile memory, and the host is coupled to the merge buffer and flash memory array component. The memory hierarchy component includes a write component and a read component. The write component writes data to at least one of the L1 cache, merge buffer, or flash memory array component. The read component reads data from at least one of the L1 cache, merge buffer, or flash memory array component.

17 Claims, 12 Drawing Sheets

EFFICIENT MEMORY HIERARCHY IN SOLID STATE DRIVE DESIGN

TECHNICAL FIELD

This disclosure relates generally to storage systems and in particular, but not exclusively, relates to an efficient memory hierarchy in solid state drive design.

BACKGROUND

A wide variety of memory media can be used to maintain and store information (e.g., data and instructions) for various computers and similar systems. In particular, flash memory is a type of electronic memory media that can be rewritten and does not require power to retain information. Information is stored in flash memory in the form of binary bit(s) (e.g., logic "0", "1", "00", "01", "10", "11"). In an unprogrammed state, a flash memory bit represents a logic 1. Any unprogrammed bit of a flash memory byte can be programmed to a logic 0 during a write operation. However, in order to change the state of a flash memory bit from a logic 0 to a logic 1, the entire block and/or sector that contains the flash memory bit must be erased—thus, writing a logic 1 to a programmed bit requires erasure of a fixed, multi-byte flash memory block and/or sector that contains the programmed bit.

The advent of flash memory has led to the development of flash memory solid state drive devices, which improve the portability of systems that require increased information storage—unlike mechanical drives, solid state drive devices lack moving parts, consume less power, and are more portable. One concern with conventional flash memory solid state drive technology is that programming and erasing a flash memory device degrades the memory device—a large number of program and erase cycles degrade the physical structure (e.g., dielectric layers) of the memory device, so as to end its usable lifetime. Another concern with conventional solid state drive technology is preserving the data integrity of memory bits that are programmed when other bits are erased—if the content of less than the total number of bytes of a multi-byte flash memory block and/or sector must be written to a logic 1 (i.e., erased), the logic state of other programmed bytes must be preserved. Yet another concern with conventional solid state drive technology is slow flash memory write and erase speed, in particularly when the required erasure of programmed bits wished to be written to a logic 1—this write time latency captures valuable host processing time that a host could utilize to perform other functions.

It is therefore desirable to have systems and methods that improve the usable lifetime of flash memory solid state drive devices, preserve the integrity of information stored on such devices, and improve host processing time.

SUMMARY

The claimed subject matter relates to systems and methods for improving the performance, reliability, and usable lifetime of flash memory solid state drive devices by utilizing an efficient memory hierarchy. Conventional flash memory solid state drive systems are limited by the useful lifetime of flash memory contained in such systems. Further, conventional technology can harm the integrity of data stored in such systems when the content of less than the total number of bytes of a multi-byte flash memory block and/or sector must be written to a logic 1. Moreover, conventional flash memory solid state drive systems suffer from long write latency.

Compared to traditional sensing methods, the novel systems and methods of the claimed subject matter increase the usable lifetime of flash memory solid state drive systems by limiting the number of system writes to a solid state drive's flash memory. In addition, the efficient memory hierarchy of the claimed subject matter preserves the integrity of data stored in a solid state drive's flash memory by preserving the logic state of programmed bytes when other bytes are erased. Further, the novel systems and methods of the claimed subject matter reduce host write latency by utilizing volatile memory, allowing a host to preserve valuable processing time.

The following presents a simplified summary of the innovation in order to provide a basic understanding of some aspects described herein. This summary is not an extensive overview of the disclosed subject matter. It is intended to neither identify key or critical elements of the disclosed subject matter nor delineate the scope of the subject innovation. Its sole purpose is to present some concepts of the disclosed subject matter in a simplified form as a prelude to the more detailed description that is presented later.

The subject invention provides systems and methods for improving the performance, reliability, and usable lifetime of flash memory solid state drive devices by utilizing an efficient memory hierarchy. In accordance with one aspect of the disclosed subject matter, a flash memory array component can store data. A memory hierarchy component coupled to a host and the flash memory array component can transfer data between the host and the flash memory array component. In accordance with another aspect of the disclosed subject matter, the memory hierarchy component can include a level one ("L1") cache coupled to a merge buffer, the flash memory array component, and the host. Further, the merge buffer is coupled to the flash memory array component. In accordance with yet another aspect of the disclosed subject matter, the L1 cache and merge buffer can include volatile memory, and the host can be coupled to the merge buffer and the flash memory array component.

In accordance with one aspect of the disclosed subject matter, the L1 cache can include a plurality of cache lines, each cache line comprising a fixed number of bytes of volatile memory. In accordance with another aspect of the disclosed subject matter, the flash memory array component can include a plurality of blocks of a fixed number of bytes of flash memory. In accordance with yet another aspect of the disclosed subject matter, the merge buffer can include at least one block of a fixed number of bytes of volatile memory, the fixed number of bytes of volatile memory of the at least one block equal to the fixed number of bytes of flash memory of each block of the plurality of blocks of the flash memory array component.

In accordance with one aspect of the disclosed subject matter, the memory hierarchy component can include a write component and read component. The write component can write data to at least one of the L1 cache, merge buffer, or flash memory array component. The read component can read data from at least one of the L1 cache, merge buffer, or flash memory array component. In accordance with another aspect of the disclosed subject matter, the write component can write the data to a cache line of the plurality of cache lines of the L1 cache, wherein the data is associated with an address, wherein the cache line is associated with the address or is not dirty, and wherein a dirty cache line is a cache line that the write component has written to, but has not copied to the flash memory array component.

In accordance with yet another aspect of the disclosed subject matter, the write component can write the cache line of the plurality of cache lines to an erased location of the flash memory array component, wherein the erased location of the flash memory array component is associated with the address. In accordance with one aspect of the disclosed subject matter, the write component can copy a block of data from the flash memory array component to a block of data of the merge buffer, wherein the block of data from the flash memory array component comprises data associated with the address, and wherein the data associated with the address has been programmed.

In accordance with another aspect of the disclosed subject matter, the write component can write the cache line of the plurality of cache lines to a location of the block of data of the merge buffer, wherein the location is associated with the address. Further, the write component can erase the block of data of the flash memory component associated with the address. In accordance with yet another aspect of the disclosed subject matter, the write component can write the block of data of the merge buffer to the block of data of the flash memory component associated with the address. In accordance with one aspect of the disclosed subject matter, the write component can clean a dirty cache line by writing the dirty cache line to a location of the flash memory array component associated with an address, wherein the dirty cache line is associated with the address. Further, the write component can write the data to the dirty cache line cleaned by the write component.

In accordance with another aspect of the disclosed subject matter, the read component can read the data from a cache line of the plurality of cache lines of the L1 cache, wherein the data is associated with an address, and wherein the cache line is associated with the address. Further, the read component can read the data from a data location of the merge buffer, wherein the data location is associated with the address. In addition, the read component can read the data from a block of data of the flash memory array component, wherein the block of data is associated with the address.

The following description and the annexed drawings set forth in detail certain illustrative aspects of the disclosed subject matter. These aspects are indicative, however, of but a few of the various ways in which the principles of the innovation may be employed. The disclosed subject matter is intended to include all such aspects and their equivalents. Other advantages and distinctive features of the disclosed subject matter will become apparent from the following detailed description of the innovation when considered in conjunction with the drawings.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

DETAILED DESCRIPTION

Embodiments of systems and methods that improve the performance, reliability, and usable lifetime of flash memory solid state drive devices by utilizing an efficient memory hierarchy are described herein. In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrase "in one embodiment" or "in an embodiment" in various places throughout this specification are not necessarily all referring to the same embodiment. Furthermore, the particular features, structures, or characteristics may be combined in any suitable manner in one or more embodiments.

The subject invention provides systems and methods that improve the performance, reliability, and usable lifetime of flash memory solid state drive devices by utilizing an efficient memory hierarchy. Embodiments of the invention include techniques for improving the usable lifetime of flash memory solid state drive devices by limiting the number of system reads and writes to flash memory of the solid state drive devices. Moreover, embodiments of the invention include techniques for preserving the integrity of data stored in a solid state drive's flash memory by preserving the logic state of programmed bytes when other bytes are erased. In addition, embodiments of the invention reduce host write latency by utilizing volatile memory.

Figure 1:
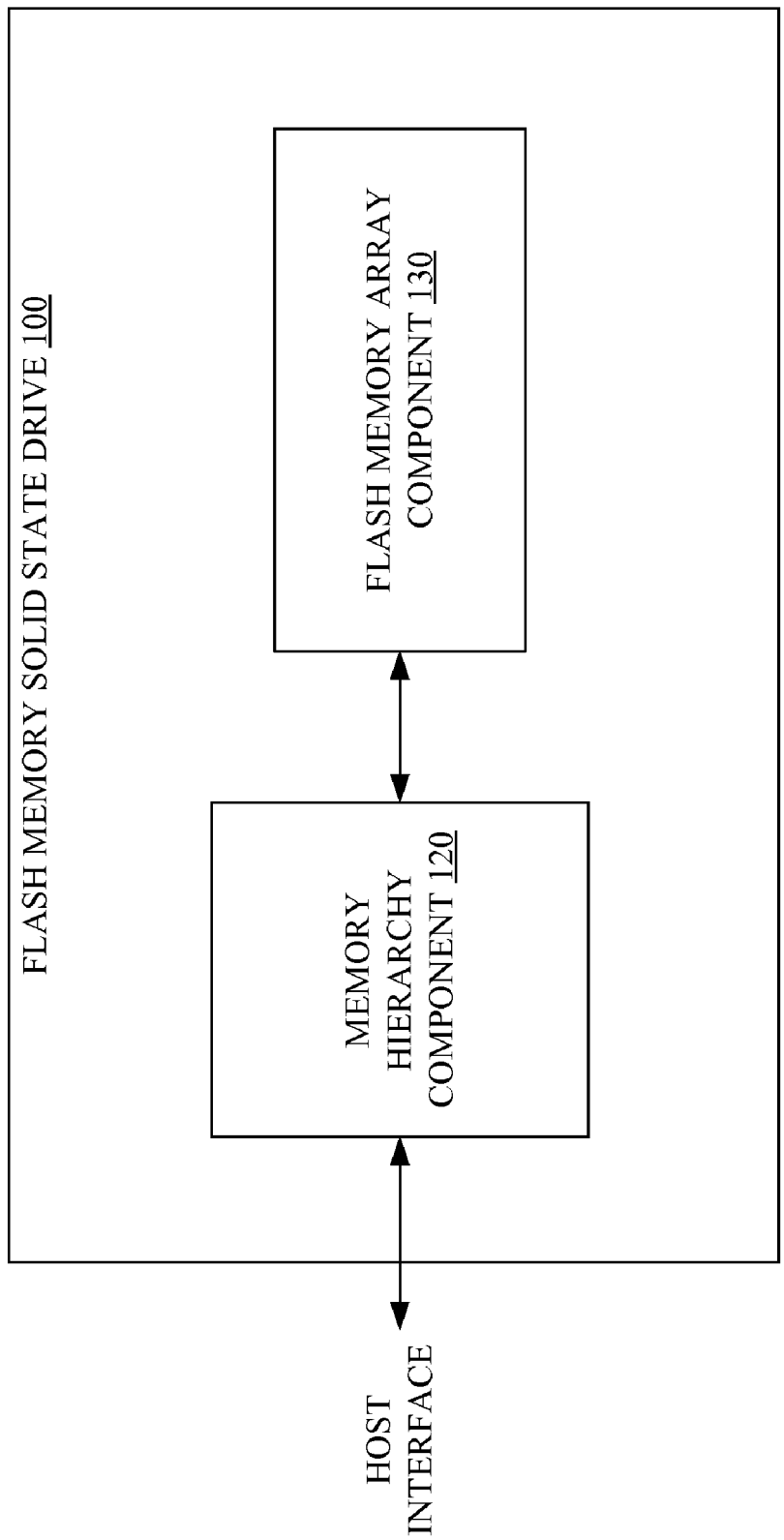
FIG. 1 is a demonstrative flash memory solid state drive system that improves the performance, reliability, and usable lifetime of flash memory solid state drive devices by utilizing an efficient memory hierarchy, in accordance with an embodiment of the invention.

FIG. 1 is a demonstrative flash memory solid state drive system that improves the performance, reliability, and usable lifetime of flash memory solid state drive devices by utilizing an efficient memory hierarchy, in accordance with an embodiment of the invention. System 100 and the systems and processes explained below may constitute machine-executable instructions embodied within a machine (e.g., computer) readable medium, which when executed by a machine will cause the machine to perform the operations described. Additionally, the systems and processes may be embodied within hardware, such as an application specific integrated circuit ("ASIC") or the like. The order in which some or all of the process blocks appear in each process should not be deemed limiting. Rather, it should be understood by a person of ordinary skill in the art having the benefit of the instant disclosure that some of the process blocks may be executed in a variety of orders not illustrated.

Flash memory solid state drive system 100 illustrated in FIG. 1 can include a flash memory array component 130 to store data. In one embodiment, flash memory array component can include at least one of a NOR flash memory, a NAND flash memory, or a combination of NOR and NAND flash memory. However, it should be appreciated that flash memory array component 130 can include any type of flash memory device. System 100 can include a memory hierarchy component 120 coupled to a host and flash memory array component 130. Memory hierarchy component 120 can transfer data between the host and flash memory array component 130. Unlike conventional technology, the subject invention improves the reliability and usable lifetime of flash memory solid state drive devices by utilizing memory hierarchy component 120 to limit the number of system reads and writes to flash memory array component 130.

Figure 2:
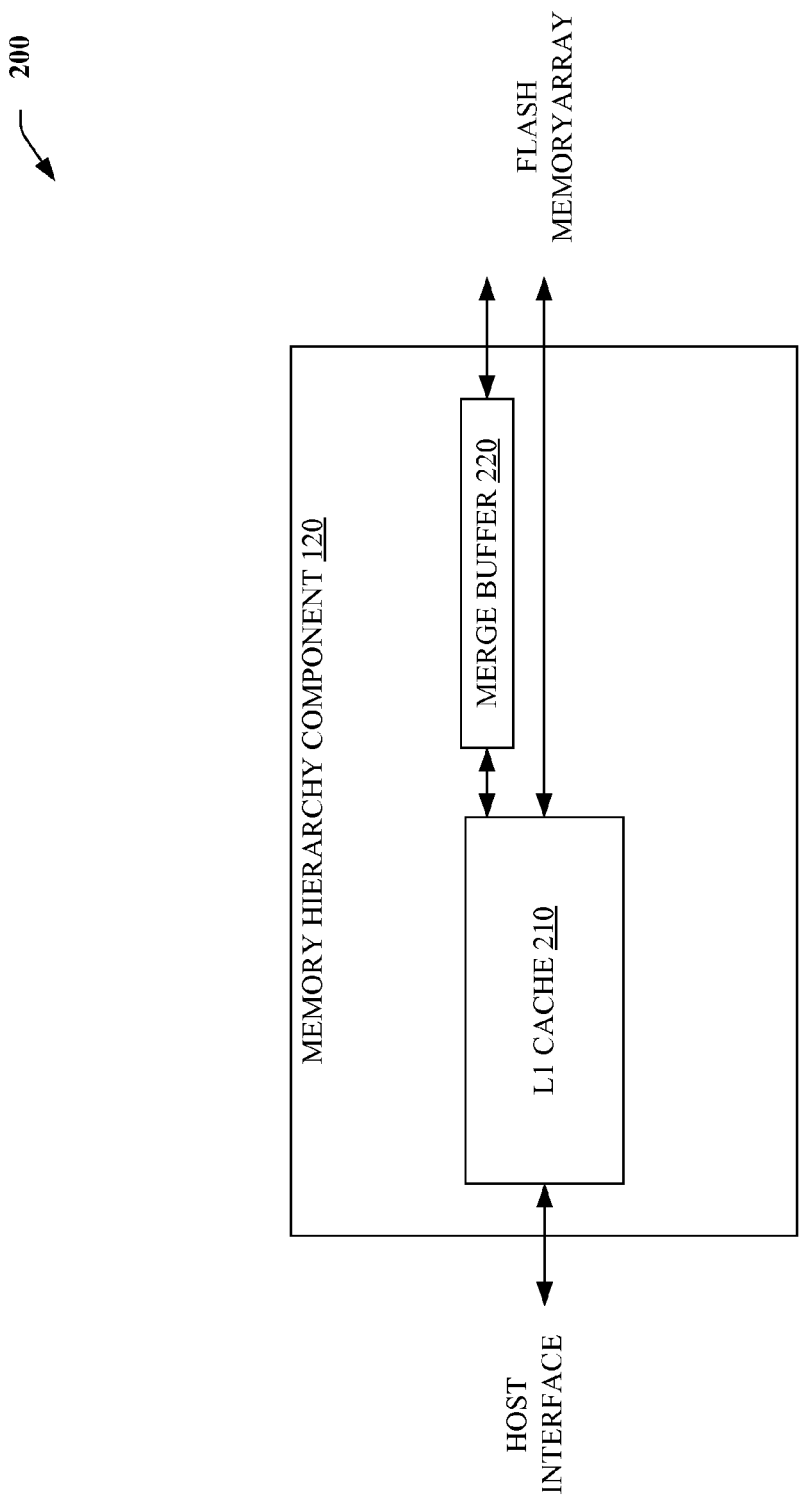
FIG. 2 illustrates a memory hierarchy component of a flash memory solid state drive system that improves the performance, reliability, and usable lifetime of flash memory solid state drive devices, in accordance with an embodiment of the invention.

FIG. 2 illustrates a memory hierarchy component 120 of a flash memory solid state drive system that improves the performance, reliability, and usable lifetime of flash memory solid state drive devices, in accordance with an embodiment of the invention. Memory hierarchy component 120 can include a level one ("L1") cache 210 coupled to a merge buffer 220, flash memory array component 130, and a host. Merge buffer 220 can be coupled to flash memory array component 130. In one embodiment of the invention, L1 cache 210 and merge buffer 220 can include volatile memory. In another embodiment of the invention, the volatile memory can include at least one of random access memory ("RAM"), synchronous RAM ("SRAM"), dynamic RAM ("DRAM"), synchronous DRAM ("SDRAM"), double data rate SDRAM ("DDR SDRAM"), enhanced SDRAM ("ESDRAM"), Synchlink DRAM ("SLDRAM"), Rambus direct RAM ("RDRAM"), direct Rambus dynamic RAM ("DRDRAM"), or Rambus dynamic RAM ("RDRAM"). However, it should be appreciated that L1 cache 210 and merge buffer 220 can include any type of volatile memory.

Figure 3:
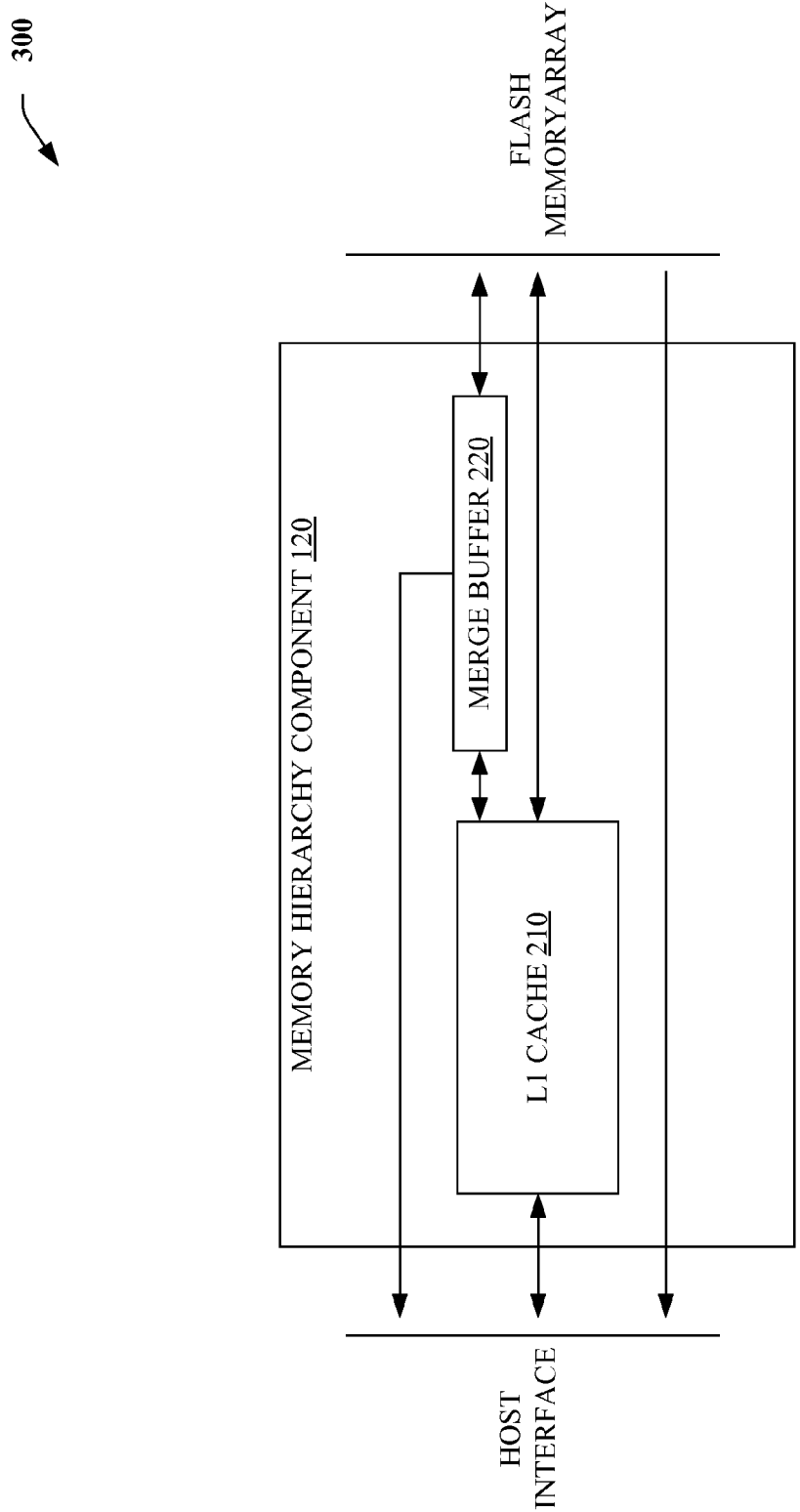
FIG. 3 is another demonstrative memory hierarchy component of a flash memory solid state drive system that improves the performance, reliability, and usable lifetime of flash memory solid state drive devices, in accordance with an embodiment of the invention.

In yet another embodiment of the invention illustrated by FIG. 3, demonstrative memory hierarchy component 120 can couple the host to merge buffer 220 and flash memory array component 130. Thus, compared to conventional technology, the subject invention not only improves the reliability and usable lifetime of flash memory solid state drive devices, but can improve flash memory read and write performance by coupling volatile memory of L1 cache 210 and merge buffer 220 to the host—host reads/writes from/to volatile memory are faster than host reads/writes from/to flash memory array component 130. Further, the subject invention improves host write latency by utilizing volatile memory of L1 cache 210 and merge buffer 220.

Figure 4:
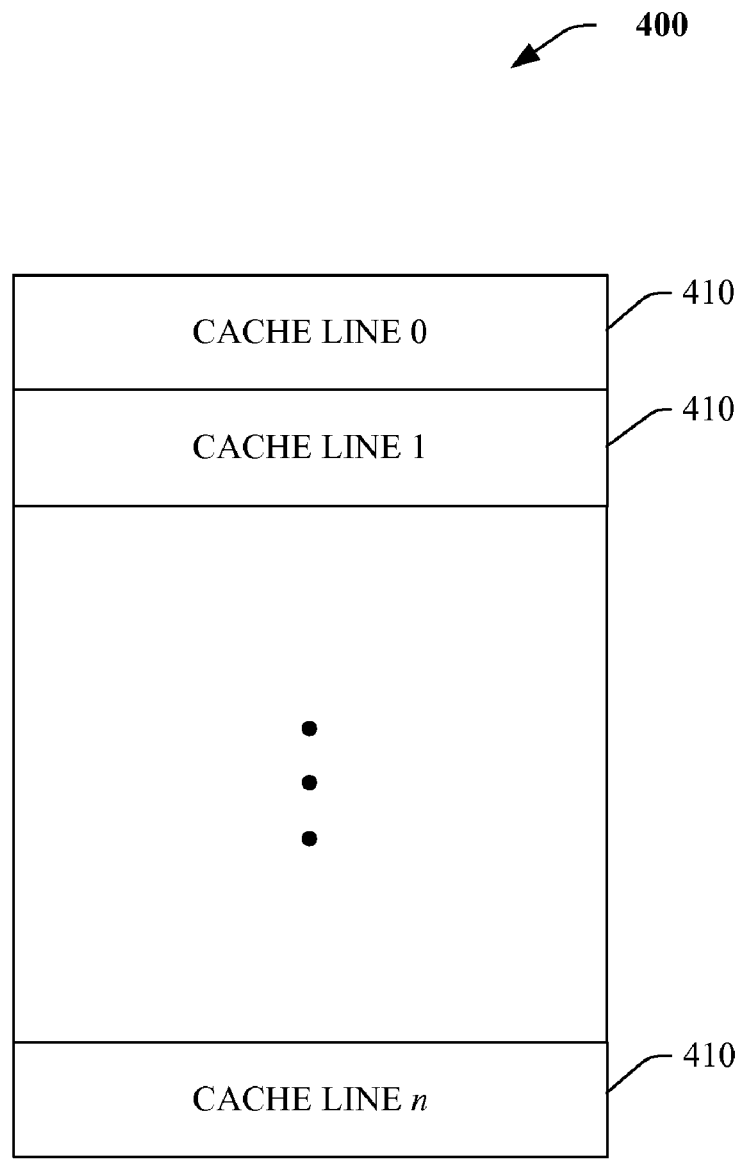
FIG. 4 is a block diagram illustrating a level one cache, in accordance with an embodiment of the invention.

FIG. 4 is a block diagram illustrating a level one ("L1") cache 400, in accordance with an embodiment of the invention. L1 cache 400 can include a plurality of cache lines 410, each cache line 410 comprising a fixed number of bytes of volatile memory. As described above, L1 cache 400 can include any type of volatile memory (e.g., RAM, SRAM, DRAM, RDRAM). In one embodiment, host read and write performance is improved by coupling L1 cache 400 to a host, as host reads/writes from/to volatile memory of L1 cache 400 are faster than host reads/writes from/to flash memory array component 130. In another embodiment, host read/write latency can be improved by utilizing a local direct memory access controller (or any other type of controller) that can transfer data from/to L1 cache 400 to merge buffer 220 and/or flash memory array component 130.

Figure 5:
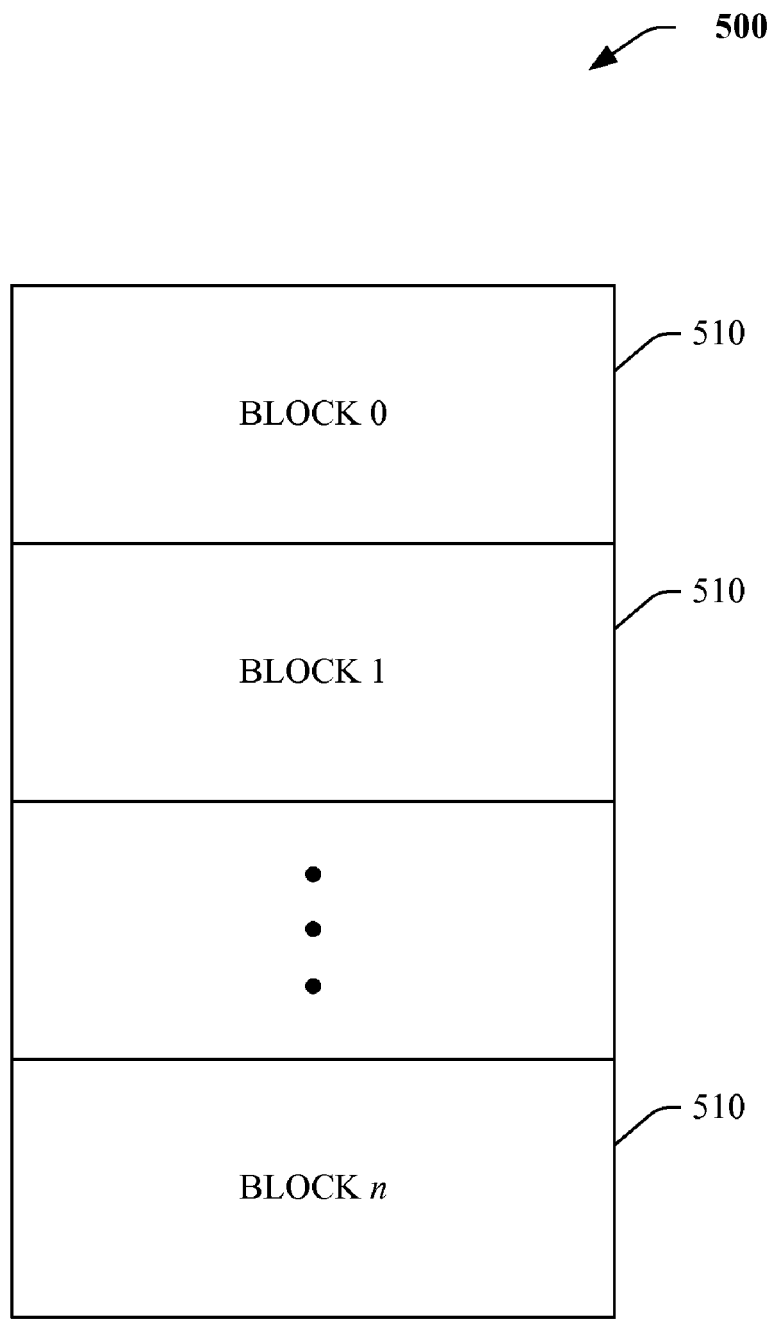
FIG. 5 is a block diagram illustrating a flash memory array component including a plurality of blocks of a fixed number of bytes of flash memory, in accordance with an embodiment of the invention.
Figure 6:
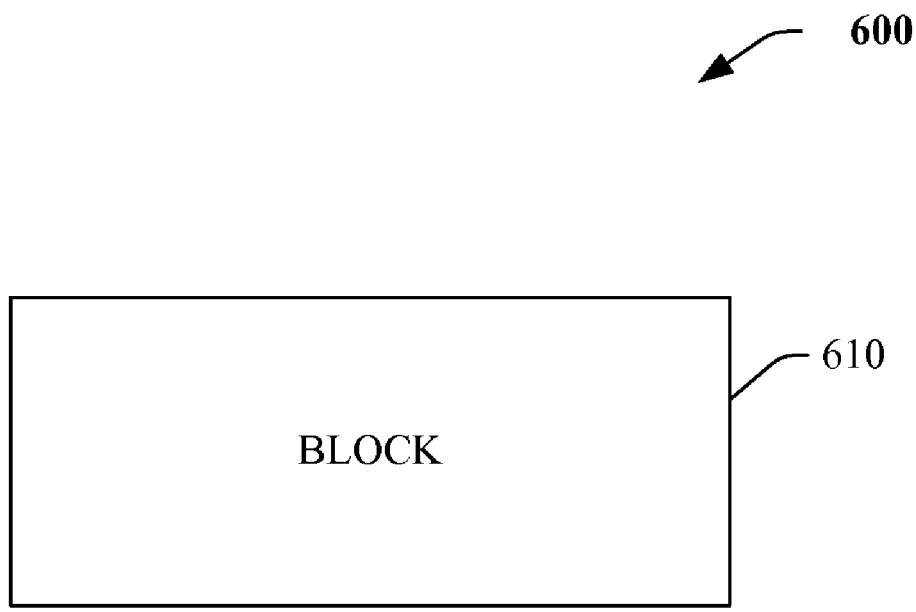
FIG. 6 is a block diagram illustrating a merge buffer, in accordance with an embodiment of the invention.

FIG. 5 is a block diagram illustrating a flash memory array component 500 including a plurality of blocks 510 of a fixed number of bytes of flash memory, in accordance with an embodiment of the invention. As described above, flash memory array component 500 can include any type of flash memory (e.g., NOR flash, NAND flash). FIG. 6 is a block diagram illustrating a merge buffer 600, in accordance with an embodiment of the invention. In one embodiment, merge buffer 600 can include at least one block 610 of a fixed number of bytes of volatile memory—the fixed number of bytes of volatile memory of the at least one block 610 equal to the fixed number of bytes of flash memory of each block 510 of the plurality of blocks 510 of flash memory array component 500.

As described above, merge buffer 600 can be coupled to L1 cache 400 and flash memory array component 500. In the embodiment illustrated by FIG. 6, merge buffer 600 includes one block 610, which allows for optimal data transfer between merge buffer 600 and flash memory array component 500. In another embodiment, host read performance is improved by coupling merge buffer 600 to a host, as host reads from volatile memory of merge buffer 600 are faster than host reads from flash memory array component 130.

Figure 7:
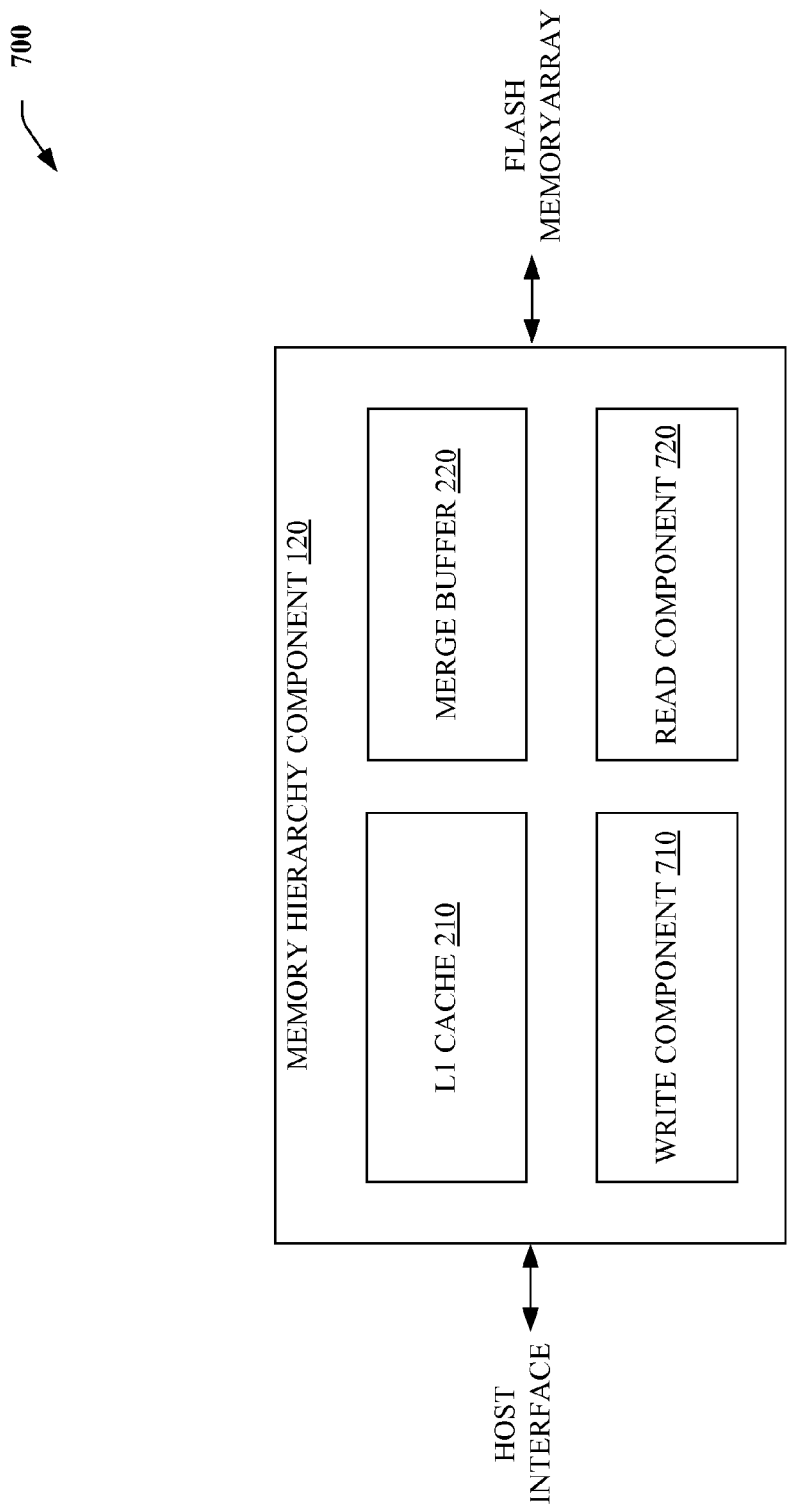
FIG. 7 is yet another demonstrative memory hierarchy component of a flash memory solid state drive system that improves the performance, reliability, and usable lifetime of flash memory solid state drive devices, in accordance with an embodiment of the invention.

FIG. 7 is yet another demonstrative memory hierarchy component 120 of a flash memory solid state drive system that improves the performance, reliability, and usable lifetime of flash memory solid state drive devices, in accordance with an embodiment of the invention. In the embodiment illustrated by FIG. 7, memory hierarchy component can include a write component 710 and read component 720. Write component 710 can write data to at least one of the L1 cache 400, merge buffer 600, or flash memory array component 500. Read component 720 can read data from at least one of the L1 cache 400, merge buffer 600, or flash memory array component 500. In another embodiment, write component 710 can write data to a cache line 410 of the plurality of cache lines 410 of L1 cache 400, wherein the data is associated with an address, wherein the cache line 410 is associated with the address or is not dirty, and wherein a dirty cache line 410 is a cache line 410 that write component 710 has written to, but has not copied to flash memory array component 500.

Figure 8:
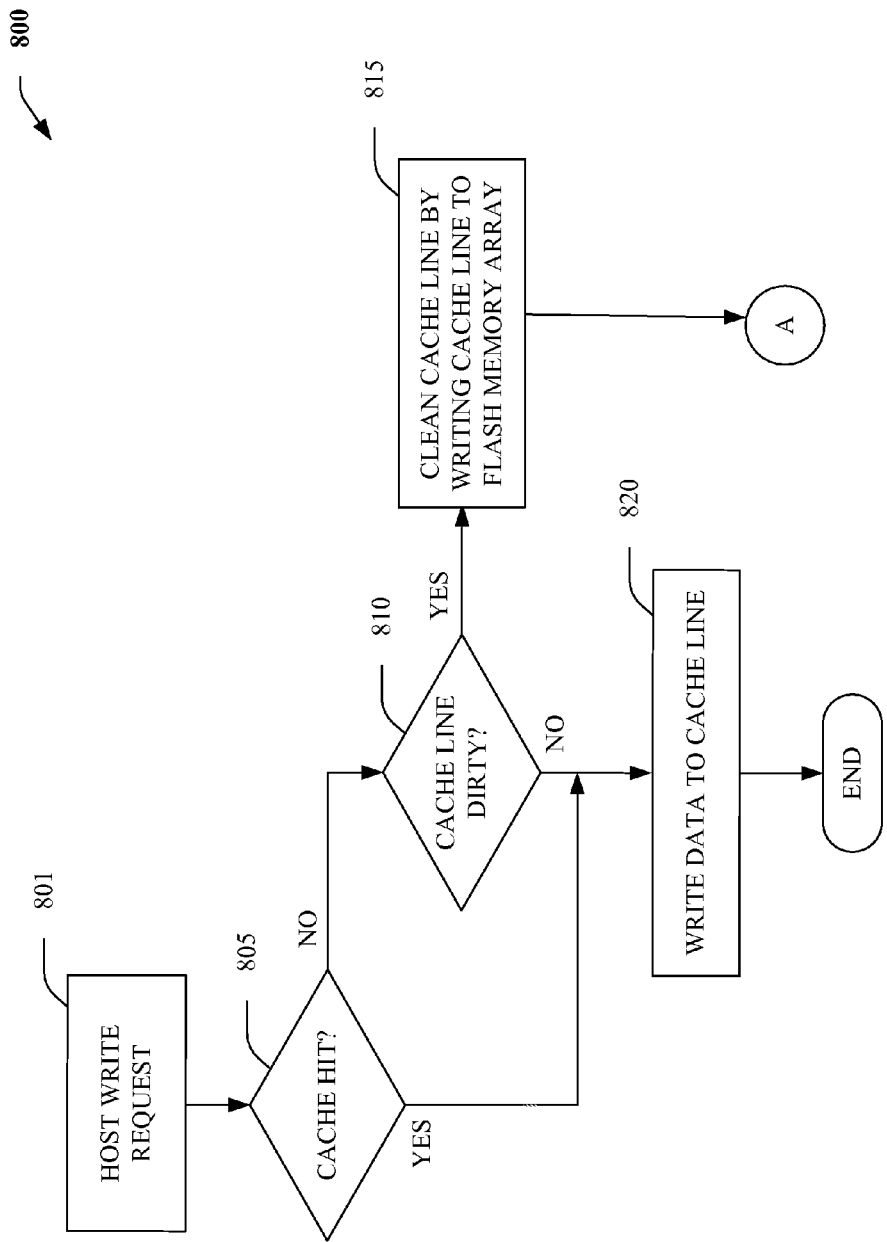
FIG. 8 is a flow chart illustrating a process performed by a write component that writes data to a cache line, in accordance with an embodiment of the invention.

FIG. 8 is a flow chart illustrating a process 800 performed by write component 710 that writes data to a cache line 410 of a plurality of cache lines 410 of L1 cache 400, in accordance with an embodiment of the invention. At 801, a host can issue a request to write data to an address located in flash memory array component 500. At a decision block 805, write component 710 can decide whether a cache hit has occurred. A cache hit occurs, as is generally known in the art, when an address associated with a data read or write request is contained in a memory cache (e.g., when an address associated with a data read or write request is contained in a cache line 410 of L1 cache 400). If a cache hit of L1 cache 400 has occurred, process 800 can continue to 820, at which write component 710 can write data associated with the host's write request to a cache line 410 of L1 cache 400, the cache line 410 associated with the address of the write request. Process 800 can end after write component 710 writes data to cache line 410 of L1 cache 400.

If a cache hit of L1 cache 400 has not occurred, process 800 can continue to 810, at which write component 710 can decide whether a cache line is dirty. A cache line is dirty, as is generally known in the art, when a cache line has been written to, but has not been copied to another memory location (e.g., when a cache line 410 has been written to, but has not been copied to flash memory array component 500). If a cache line 410 of L1 cache 400 is not dirty, process 800 can continue to 820, at which write component 710 can write data associated with the host's write request to the cache line 410. Process 800 can end after write component 710 writes data to cache line 410. If a cache line 410 of L1 cache 400 is dirty, process 800 can continue to 815, at which write component 710 can clean the cache line 410 by copying the cache line 410 to a location in flash memory array component 500 associated with an address contained in cache line 410.

Figure 9:
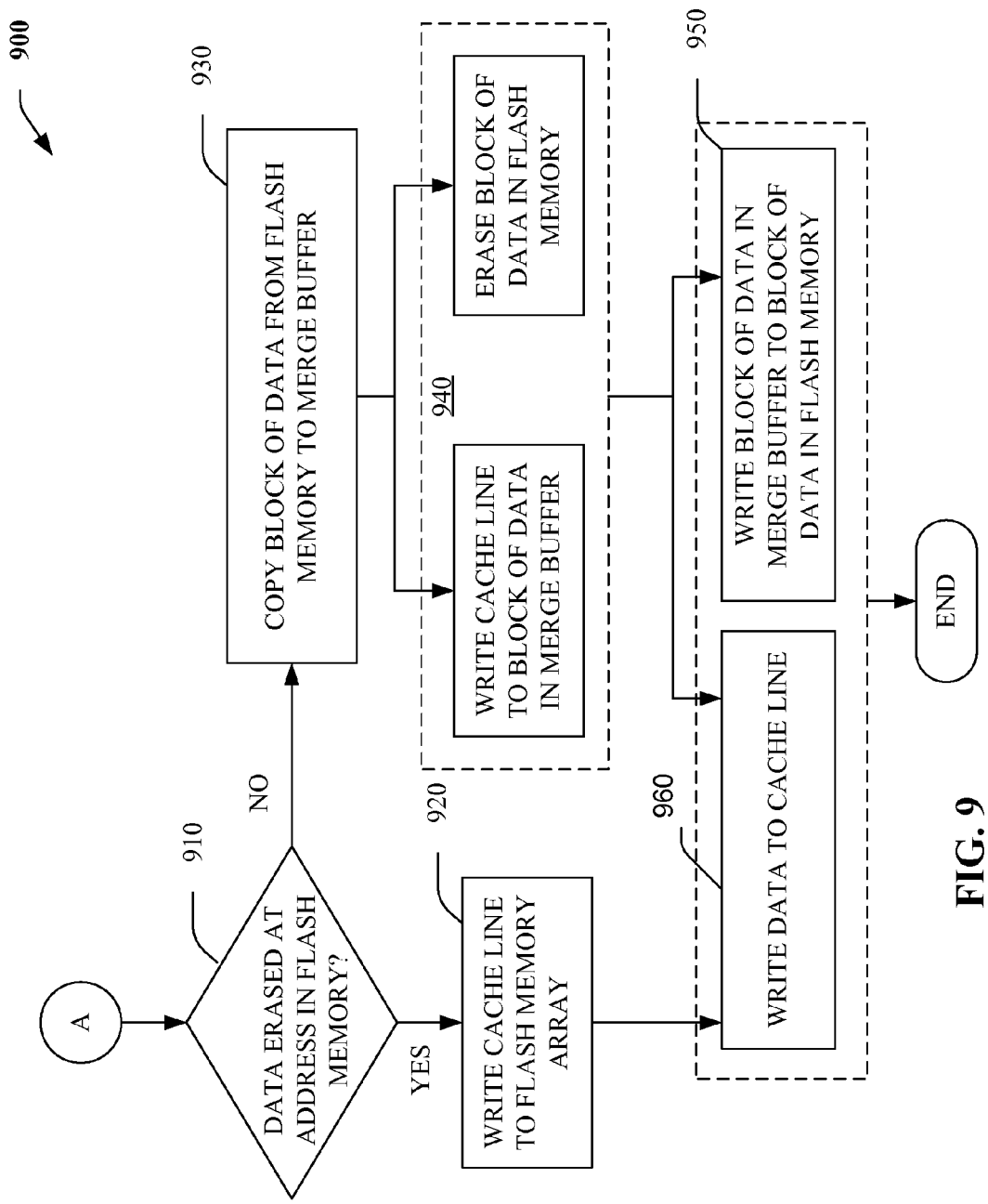
FIG. 9 is a flow chart illustrating a process performed by a write component that writes data to a flash memory array component, in accordance with an embodiment of the invention.

FIG. 9 is a flow chart illustrating a process 900 performed by write component 710 that writes data to a flash memory array component 500, in accordance with an embodiment of the invention. After write component 710 decides a cache line 410 of L1 cache 400 is dirty, process 800 can continue from 815 to 910, at which write component 710 can decide whether data at a location in flash memory array component 500 associated with an address contained in cache line 410 is erased. If data at the location in flash memory array component 500 is erased, process 900 can continue to 920, at which write component 710 can write data contained in cache line 410 to the location in flash memory component 130. Process 900 can continue to 960, at which write component 710 can write data associated with the host's write request to the cache line 410. Process 900 can end after writing data to cache line 410.

If data at the location in flash memory array component 500 associated with an address contained in cache line 410 is not erased, process 900 can continue to 930, at which write component 710 can copy a block of data from a block 510 of flash memory array component 500 to a block 610 of merge buffer 600, the block of data from block 510 associated with the address contained in cache line 410. Process 900 can continue to 940, at which write component 710 can write data contained in cache line 410 to a location in block 610 of merge buffer 600, the location associated with the address contained in cache line 410. Further, write component 710 can erase the block of data of block 510 of flash memory array component 500 associated with the address contained in cache line 410. It should be appreciated that write component 710 can write data contained in cache line 410 to the location in block 610 and erase the block of data of block 510 in parallel, minimizing write delay. Process 900 can continue to 950 and 960 in parallel. At 950, write component 710 can write the block of data of block 610 of merge buffer 600 to the block of data of block 510 of flash memory array component 500 associated with the address contained in cache line 410. At 960, write component 710 can write data associated with the host's write request to the cache line 410. Process 900 can end after writing data associated with the host's write request to the cache line 410 and writing the block of data of block 610 of merge buffer 600 to flash memory array component 500.

Figure 10:
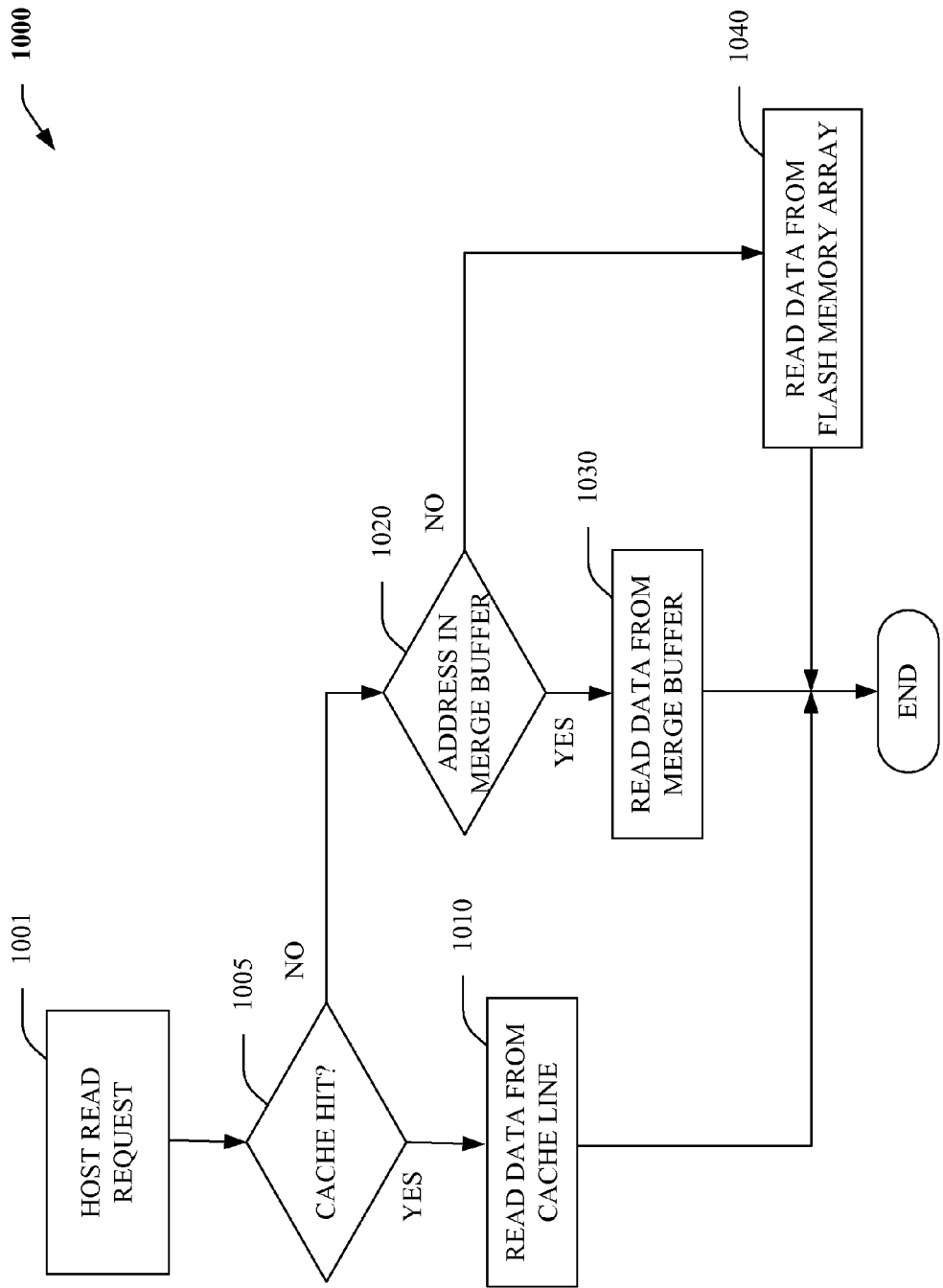
FIG. 10 is a flow chart illustrating a process performed by a write component that reads data utilizing an efficient memory hierarchy, in accordance with an embodiment of the invention.

FIG. 10 is a flow chart illustrating a process 1000 performed by read component 720 that reads data utilizing an efficient memory hierarchy, in accordance with an embodiment of the invention. At 1001, a host can issue a request to read data from an address located in flash memory array component 500. At a decision block 1005, read component 720 can decide whether a cache hit has occurred. As described above, a cache hit occurs, as is generally known in the art, when an address associated with a data read or write request is contained in a memory cache (e.g., when an address associated with a data read or write request is contained in a cache line 410 of L1 cache 400). If a cache hit of L1 cache 400 has occurred, process 1000 can continue to 1010, at which read component 720 can read data associated with the hosts read request from a cache line 410 of L1 cache 400, the cache line 410 associated with the address of the read request.

If a cache hit of L1 cache 400 has not occurred, process 1000 can continue to 1020, at which read component 720 can decide whether a location in a block 610 of merge buffer 600 is associated with the address of the read request. If a location in a block 610 of merge buffer 600 is associated with the address of the read request, process 1000 can continue to 1030, at which read component 720 can read data from the location of block 610 of merge buffer 600. If no locations in merger buffer 600 are associated with the address of the read request, process 1000 can continue to 1040, at which read component 720 can read data from a location of flash memory array component 500 associated with the address of the read request.

What has been described above includes examples of the subject innovation. It is, of course, not possible to describe every conceivable combination of components or methodologies for purposes of describing the subject innovation, but one of ordinary skill in the art can recognize that many further combinations and permutations of the subject innovation are possible. Accordingly, the disclosed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

As utilized herein, terms "component," "system," "interface," and the like are intended to refer to a computer-related entity, hardware, software in execution, and/or firmware. For example, a component can be a process running on a processor, a processor, an object, an executable, a program, and/or a computer. By way of illustration, both an application running on a server and the server can be a component. One or more components can reside within a process and a component can be localized on one computer and/or distributed between two or more computers.

Artificial intelligence based systems (e.g., explicitly and/or implicitly trained classifiers) can be employed in connection with performing inference and/or probabilistic determinations and/or statistical-based determinations as in accordance with one or more aspects of the disclosed subject matter as described herein. As used herein, the term "inference," "infer," or variations in form thereof refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events.

Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines) can be employed in connection with performing automatic and/or inferred action in connection with the disclosed subject matter.

Furthermore, the disclosed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include, but are not limited to, magnetic storage devices (e.g., hard disk, floppy disk, magnetic strips), optical disks (e.g., CD, DVD), smart cards, and flash memory devices (e.g., card, stick, key drive).

Further, it should be appreciated that a carrier wave can be employed to carry computer-readable electronic data such as those used in transmitting and receiving electronic mail or in accessing a network such as the Internet or a local area network ("LAN"). Of course, those skilled in the art will recognize many modifications may be made to this configuration without departing from the scope or spirit of the disclosed subject matter. Moreover, the word "exemplary" is used herein to mean serving as an example, instance, or illustration. Any aspect or design described herein as "exemplary" is not necessarily to be construed as preferred or advantageous over other aspects or designs.

Figure 11:
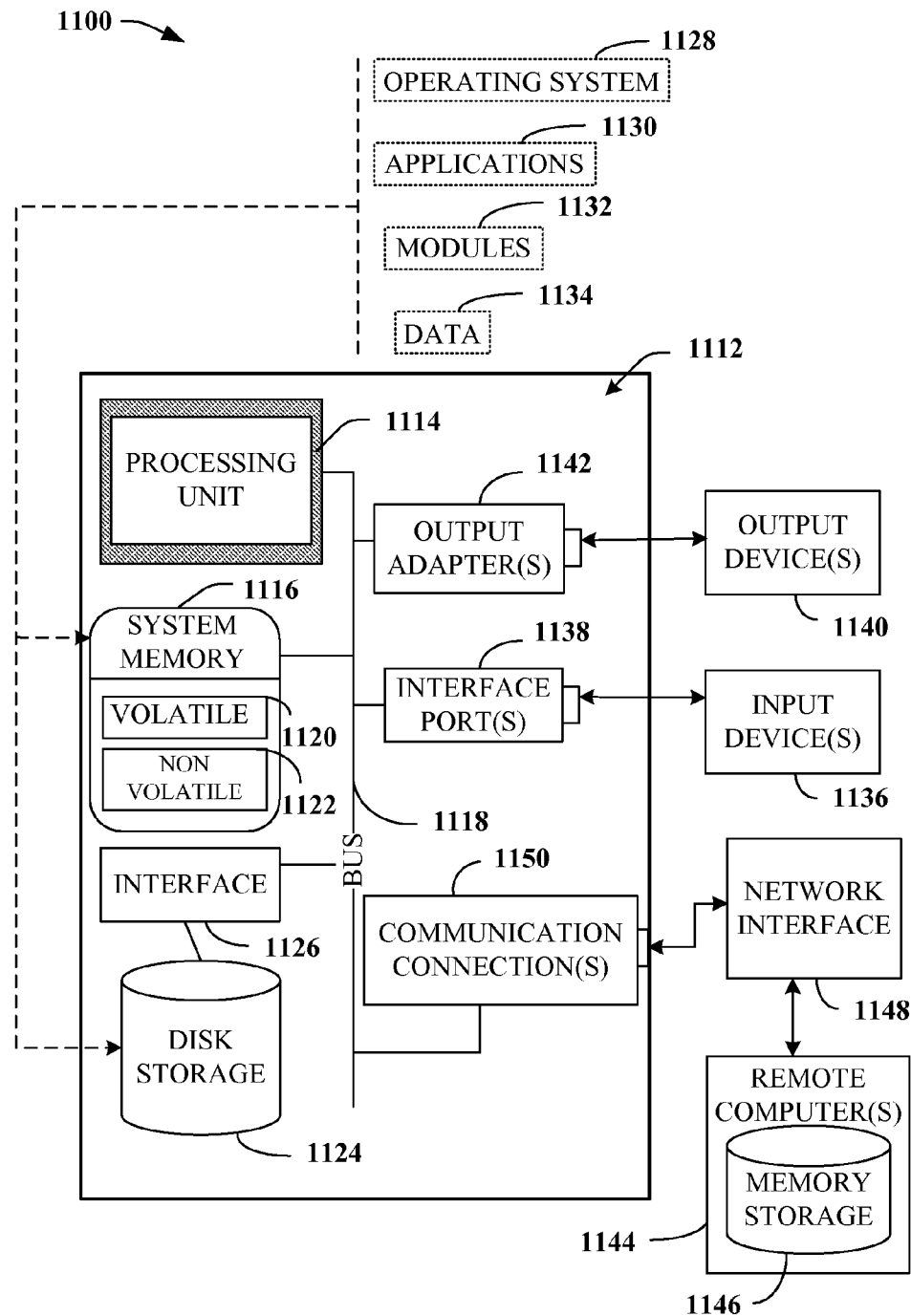
FIG. 11 is a schematic block diagram illustrating a suitable operating environment.
Figure 12:
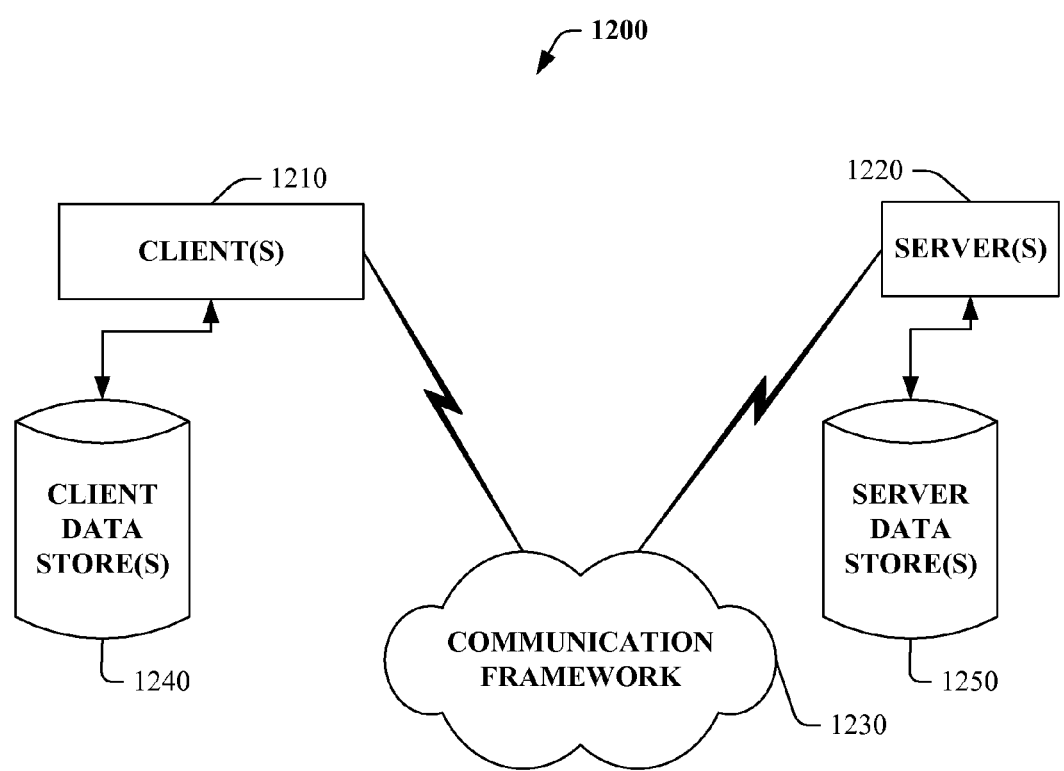
FIG. 12 is a schematic block diagram of a sample-computing environment.

In order to provide a context for the various aspects of the disclosed subject matter, FIGS. 11 and 12, as well as the following discussion, are intended to provide a brief, general description of a suitable environment in which the various aspects of the disclosed subject matter may be implemented. While the subject matter has been described above in the general context of computer-executable instructions of a computer program that runs on a computer and/or computers, those skilled in the art will recognize that the subject innovation also may be implemented in combination with other program modules. Generally, program modules include routines, programs, components, data structures, etc. that perform particular tasks and/or implement particular abstract data types.

Moreover, those skilled in the art will appreciate that the inventive systems may be practiced with other computer system configurations, including single-processor or multiprocessor computer systems, mini-computing devices, mainframe computers, as well as personal computers, hand-held computing devices (e.g., PDA, phone, watch), microprocessor-based or programmable consumer or industrial electronics, and the like. The illustrated aspects may also be practiced in distributed computing environments where tasks are performed by remote processing devices that are linked through a communications network. However, some, if not all aspects of the claimed innovation can be practiced on stand-alone computers. In a distributed computing environment, program modules may be located in both local and remote memory storage devices.

With reference to FIG. 11, a suitable environment 1100 for implementing various aspects of the claimed subject matter includes a computer 1112. The computer 1112 includes a processing unit 1114, a system memory 1116, and a system bus 1118. The system bus 1118 couples system components including, but not limited to, the system memory 1116 to the processing unit 1114. The processing unit 1114 can be any of various available processors. Dual microprocessors and other multiprocessor architectures also can be employed as the processing unit 1114.

The system bus 1118 can be any of several types of bus structure(s) including the memory bus or memory controller, a peripheral bus or external bus, and/or a local bus using any variety of available bus architectures including, but not limited to, Industrial Standard Architecture ("ISA"), Micro-Channel Architecture ("MSA"), Extended ISA ("EISA"), Intelligent Drive Electronics ("IDE"), VESA Local Bus ("VLB"), Peripheral Component Interconnect ("PCI"), Card Bus, Universal Serial Bus ("USB"), Advanced Graphics Port ("AGP"), Personal Computer Memory Card International Association bus ("PCMCIA"), Firewire (IEEE 1394), and Small Computer Systems Interface ("SCSI").

The system memory 1116 includes volatile memory 1120 and nonvolatile memory 1122. The basic input/output system ("BIOS"), containing the basic routines to transfer information between elements within the computer 1112, such as during start-up, is stored in nonvolatile memory 1122. By way of illustration, and not limitation, nonvolatile memory 1122 can include ROM, PROM, EPROM, EEPROM, or flash memory. Volatile memory 1120 includes RAM, which acts as external cache memory. By way of illustration and not limitation, RAM is available in many forms such as SRAM, dynamic RAM ("DRAM"), synchronous DRAM ("SDRAM"), double data rate SDRAM ("DDR SDRAM"), enhanced SDRAM ("ESDRAM"), Synchlink DRAM ("SLDRAM"), Rambus direct RAM ("RDRAM"), direct Rambus dynamic RAM ("DRDRAM"), and Rambus dynamic RAM ("RDRAM").

Computer 1112 also includes removable/non-removable, volatile/non-volatile computer storage media. FIG. 11 illustrates, for example, a disk storage 1124. Disk storage 1124 includes, but is not limited to, devices like a magnetic disk drive, floppy disk drive, tape drive, Jaz drive, Zip drive, LS-100 drive, flash memory card, or memory stick. In addition, disk storage 1124 can include storage media separately or in combination with other storage media including, but not limited to, an optical disk drive such as a compact disk ROM device ("CD-ROM"), CD recordable drive ("CD-R Drive"), CD rewritable drive ("CD-RW Drive") or a digital versatile disk ROM drive ("DVD-ROM"). To facilitate connection of the disk storage devices 1124 to the system bus 1118, a removable or non-removable interface is typically used, such as interface 1126.

It is to be appreciated that FIG. 11 describes software that acts as an intermediary between users and the basic computer resources described in the suitable operating environment 1100. Such software includes an operating system 1128. Operating system 1128, which can be stored on disk storage 1124, acts to control and allocate resources of the computer system 1112. System applications 1130 take advantage of the management of resources by operating system 1128 through program modules 1132 and program data 1134 stored either in system memory 1116 or on disk storage 1124. It is to be appreciated that the disclosed subject matter can be implemented with various operating systems or combinations of operating systems.

A user enters commands or information into the computer 1112 through input device(s) 1136. Input devices 1136 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1114 through the system bus 1118 via interface port(s) 1138. Interface port(s) 1138 include, for example, a serial port, a parallel port, a game port, and a universal serial bus ("USB"). Output device(s) 1140 use some of the same type of ports as input device(s) 1136.

Thus, for example, a USB port may be used to provide input to computer 1112, and to output information from computer 1112 to an output device 1140. Output adapter 1142 is provided to illustrate that there are some output devices 1140 like monitors, speakers, and printers, among other output devices 1140, which require special adapters. The output adapters 1142 include, by way of illustration and not limitation, video and sound cards that provide a means of connection between the output device 1140 and the system bus 1118. It should be noted that other devices and/or systems of devices provide both input and output capabilities such as remote computer(s) 1144.

Computer 1112 can operate in a networked environment using logical connections to one or more remote computers, such as remote computer(s) 1144. The remote computer(s) 1144 can be a personal computer, a server, a router, a network PC, a workstation, a microprocessor based appliance, a peer device or other common network node and the like, and typically includes many or all of the elements described relative to computer 1112.

For purposes of brevity, only a memory storage device 1146 is illustrated with remote computer(s) 1144. Remote computer(s) 1144 is logically connected to computer 1112 through a network interface 1148 and then physically connected via communication connection 1150. Network interface 1148 encompasses wire and/or wireless communication networks such as local-area networks ("LAN") and wide-area networks ("WAN"). LAN technologies include Fiber Distributed Data Interface ("FDDI"), Copper Distributed Data Interface ("CDDI"), Ethernet, Token Ring and the like. WAN technologies include, but are not limited to, point-to-point links, circuit switching networks like Integrated Services Digital Networks ("ISDN") and variations thereon, packet switching networks, and Digital Subscriber Lines ("DSL").

Communication connection(s) 1150 refer(s) to the hardware/software employed to connect the network interface 1148 to the bus 1118. While communication connection 1150 is shown for illustrative clarity inside computer 1112, it can also be external to computer 1112. The hardware/software necessary for connection to the network interface 1148 includes, for exemplary purposes only, internal and external technologies such as, modems including regular telephone grade modems, cable modems and DSL modems, ISDN adapters, and Ethernet cards.

FIG. 12 is a schematic block diagram of a sample-computing environment 1200 with which the subject innovation can interact. The system 1200 includes one or more client(s) 1210. The client(s) 1210 can be hardware and/or software (e.g., threads, processes, computing devices). The system 1200 also includes one or more server(s) 1220. Thus, system 1200 can correspond to a two-tier client server model or a multi-tier model (e.g., client, middle tier server, data server), amongst other models. The server(s) 1220 can also be hardware and/or software (e.g., threads, processes, computing devices). The servers 1220 can house threads to perform transformations by employing the subject innovation, for example. One possible communication between a client 1210 and a server 1220 may be in the form of a data packet transmitted between two or more computer processes.

The system 1200 includes a communication framework 1230 that can be employed to facilitate communications between the client(s) 1210 and the server(s) 1220. The client(s) 1210 are operatively connected to one or more client data store(s) 1240 that can be employed to store information local to the client(s) 1210. Similarly, the server(s) 1220 are operatively connected to one or more server data store(s) 1250 that can be employed to store information local to the servers 1220.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art should recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A system comprising:
a flash memory array component that stores data; and
a memory hierarchy component coupled to a host and the flash memory array component, wherein the memory hierarchy component transfers the data between the host and the flash memory array component, the memory hierarchy component includes a write component that writes the data to a cache line of a plurality of cache lines of a level one cache in response to a determination that an address associated with the data is contained in the cache line or the cache line is not dirty, copies a block of data from the flash memory array component to a merge buffer in response to a determination that the cache line is dirty and flash memory data is not erased at a location in the flash memory array component associated with the address contained in the cache line, cleans the dirty cache line by writing the dirty cache line to the location in the flash memory array component associated with the address in response to a determination that the cache line is dirty and the flash memory data is erased at the location in the flash memory array component associated with the address contained in the cache line, and writes the data to the dirty cache line cleaned by the write component, wherein the dirty cache line is a cache line that the write component has written to but has not copied to the flash memory array component, and wherein the level one cache is coupled to the merge buffer, the flash memory array component, and the host.

2. The system of claim 1, wherein the merge buffer is coupled to the flash memory array component.

3. The system of claim 2, wherein the level one cache and the merge buffer comprise volatile memory.

4. The system of claim 3, wherein the level one cache comprises a plurality of cache lines, wherein each of the plurality of cache lines comprises a fixed number of bytes of volatile memory.

5. The system of claim 4, wherein the flash memory array component comprises a plurality of blocks, and wherein each block of the plurality of blocks comprises a fixed number of bytes of flash memory.

6. The system of claim 5, wherein the merge buffer comprises at least one block, wherein the at least one block comprises a fixed number of bytes of volatile memory, and wherein the fixed number of bytes of volatile memory of the at least one block is equal to the fixed number of bytes of flash memory of each block of the plurality of blocks of the flash memory array component.

7. The system of claim 6, wherein the flash memory comprises at least one of a NOR flash memory, a NAND flash memory, or a combination thereof.

8. The system of claim 7, wherein the volatile memory comprises at least one of random access memory ("RAM"), synchronous RAM ("SRAM"), dynamic RAM ("DRAM"), synchronous DRAM ("SDRAM"), double data rate SDRAM ("DDR SDRAM"), enhanced SDRAM ("ESDRAM"), Synchlink DRAM ("SLDRAM"), Rambus direct RAM ("RDRAM"), direct Rambus dynamic RAM ("DRDRAM"), or Rambus dynamic RAM ("RDRAM").

9. The system of claim 2, wherein the write component is configured to write the data to the level one cache, the merge buffer, and the flash memory array component; and
a read component reads data from at least one of the level one cache, merge buffer, or flash memory array component.

10. The system of claim 9, wherein the write component further comprises:
writing the cache line of the plurality of cache lines to an erased location of the flash memory array component, wherein the erased location of the flash memory array component is associated with the address.

11. The system of claim 10, wherein the block of data from the flash memory array component comprises data associated with the address, and wherein the data associated with the address has been programmed.

12. The system of claim 11, wherein the write component further comprises:
writing the cache line of the plurality of cache lines to a location of the block of data copied to the merge buffer, wherein the location is associated with the address; and
erasing the block of data from the flash memory array component associated with the address.

13. The system of claim 12, wherein the write component further comprises:
writing the block of data copied to the merge buffer to the location in the flash memory array component associated with the address contained in the cache line.

14. The system of claim 9, wherein the read component comprises:
reading the data from a cache line of the plurality of cache lines of the level one cache, wherein the data is associated with an address, and wherein the cache line is associated with the address;
reading the data from a data location in the merge buffer, wherein the data location is associated with the address; and
reading the data from a block of data in the flash memory array component, wherein the block of data is associated with the address.

15. A memory device comprising the system of claim 1.

16. A system comprising:
a means for storing data in a flash memory array component;
a means for transferring the data between a host and the flash memory array component utilizing a memory hierarchy component, wherein the means for transferring writes the data to a cache line of a level one cache in response to a determination that an address associated with the data is contained in the cache line or that the cache line is not dirty, and wherein the means for transferring is configured to write the data to the level one cache, a merge buffer, and the flash memory array component;
a means for copying a block of data from the flash memory array component to the merge buffer in response to a determination that the cache line is dirty and flash memory data is not erased at a location in the flash memory array component associated with the address contained in the cache line; and
a means for cleaning a dirty cache line in response to a determination that the cache line is dirty and the flash memory data is erased at the location in the flash memory array component associated with the address contained in the cache line, wherein the means for cleaning includes writing the dirty cache line to the location in the flash memory array component associated with the address and writing the data to the dirty cache line cleaned by the means for cleaning, wherein the dirty cache line is a cache line that the means for transferring has written to, but has not copied to the flash memory array component.

17. The system of claim 16, further comprising:
a means for transferring the data between a level one cache of the memory hierarchy component and the merge buffer of the memory hierarchy component;
a means for transferring the data between the level one cache and the flash memory array component;
a means for transferring the data between the merge buffer and the flash memory array component; and
a means for transferring the data between the host and the level one cache, the merge buffer, and the flash memory array component.

* * * * *